United States Patent
Sloane et al.

(10) Patent No.: US 11,741,228 B2
(45) Date of Patent: Aug. 29, 2023

(54) SYSTEM FOR GENERATING COMPUTING NETWORK SEGMENTATION AND ISOLATION SCHEMES USING DYNAMIC AND SHIFTING CLASSIFICATION OF ASSETS

(71) Applicant: Bank of America Corporation, Charlotte, NC (US)

(72) Inventors: Brandon Sloane, Santa Barbara, CA (US); Adriana Tache, Falls Church, VA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 296 days.

(21) Appl. No.: 17/002,314

(22) Filed: Aug. 25, 2020

(65) Prior Publication Data
US 2022/0067158 A1  Mar. 3, 2022

(51) Int. Cl.
*H04L 41/12* (2022.01)
*G06F 21/56* (2013.01)

(52) U.S. Cl.
CPC .......... *G06F 21/561* (2013.01); *G06F 21/568* (2013.01); *H04L 41/12* (2013.01)

(58) Field of Classification Search
CPC . H04L 63/107; H04L 63/1433; G06F 21/568; G06F 41/12
See application file for complete search history.

(56) References Cited

U.S. PATENT DOCUMENTS

| | | | |
|---|---|---|---|
| 7,472,422 B1 * | 12/2008 | Agbabian | H04L 41/06 726/25 |
| 7,904,962 B1 * | 3/2011 | Jajodia | H04L 63/1425 709/224 |
| 7,926,113 B1 * | 4/2011 | Gula | H04L 63/1425 726/25 |
| 8,135,657 B2 | 3/2012 | Kapoor et al. | |
| 8,443,066 B1 | 5/2013 | Saraiya et al. | |
| 8,942,236 B1 | 1/2015 | Vincent et al. | |
| 9,152,647 B2 | 10/2015 | Peters et al. | |
| 9,225,646 B2 | 12/2015 | Heinz et al. | |
| 9,288,081 B2 | 3/2016 | Casado et al. | |
| 9,294,386 B2 | 3/2016 | Narad | |
| 9,317,469 B2 | 4/2016 | Gross et al. | |
| RE46,206 E | 11/2016 | Jorgensen | |
| 9,560,068 B2 | 1/2017 | Figlin et al. | |
| 9,621,568 B2 | 4/2017 | Shieh | |

(Continued)

*Primary Examiner* — Michael W Chao
(74) *Attorney, Agent, or Firm* — Moore & Van Allen PLLC; Seongun M. Hong

(57) ABSTRACT

A system is provided for generating computing network segmentation and isolation schemes using dynamic and shifting classification of assets. In particular, the system may comprise various components that may identify and classify assets (e.g., computing devices) within a network, network topology, and vectors that may compromise one or more assets. The system may further comprise a component for mitigating and rectifying the effects of such vectors. Each asset within the network may be assigned a classification which may be dynamically modified and/or shifted by the system based on changing requirements and/or environments. In this way, the system may provide a more comprehensive way to protect the integrity and security of computing devices and/or electronic data.

20 Claims, 2 Drawing Sheets

(56) References Cited

U.S. PATENT DOCUMENTS

| | | | |
|---|---|---|---|
| 9,648,036 B2 * | 5/2017 | Seiver | H04L 63/0236 |
| 9,734,169 B2 | 8/2017 | Redlich et al. | |
| 9,942,623 B2 | 4/2018 | Srinivas et al. | |
| 10,122,760 B2 | 11/2018 | Terrill et al. | |
| 10,230,587 B2 | 3/2019 | Cordray et al. | |
| 10,374,904 B2 | 8/2019 | Dubey et al. | |
| 10,650,150 B1 * | 5/2020 | Rajasooriya | G06F 21/577 |
| 10,749,796 B2 * | 8/2020 | Dowlatkhah | H04L 41/40 |
| 10,779,339 B2 | 9/2020 | Verkaik et al. | |
| 11,159,555 B2 * | 10/2021 | Hadar | H04L 63/1433 |
| 11,438,362 B2 * | 9/2022 | Aleidan | H04L 63/1425 |
| 11,509,501 B2 * | 11/2022 | Pallas | H04L 12/4641 |
| 11,611,480 B2 * | 3/2023 | Barkovic | H04L 41/22 |
| 11,632,320 B2 * | 4/2023 | Castle | H04L 43/0817 709/224 |
| 11,645,176 B2 * | 5/2023 | Hicks | G06F 11/3006 726/25 |
| 11,647,039 B2 * | 5/2023 | Crabtree | H04L 63/1425 726/22 |
| 2002/0073338 A1 * | 6/2002 | Burrows | H04L 41/0213 709/224 |
| 2003/0217039 A1 * | 11/2003 | Kurtz | G02B 6/105 |
| 2005/0044418 A1 * | 2/2005 | Miliefsky | H04L 63/0272 726/4 |
| 2005/0257267 A1 * | 11/2005 | Williams | H04L 63/1408 726/25 |
| 2005/0259657 A1 * | 11/2005 | Gassoway | H04L 63/145 370/392 |
| 2007/0297349 A1 * | 12/2007 | Arkin | H04L 12/66 370/255 |
| 2008/0172716 A1 * | 7/2008 | Talpade | H04L 63/20 726/1 |
| 2011/0277034 A1 * | 11/2011 | Hanson | G06F 21/554 709/224 |
| 2012/0185910 A1 * | 7/2012 | Miettinen | H04L 63/107 726/1 |
| 2013/0322266 A1 * | 12/2013 | Maon | H04L 43/18 370/252 |
| 2014/0013434 A1 * | 1/2014 | Ranum | G06F 21/564 726/24 |
| 2014/0173738 A1 * | 6/2014 | Condry | G06F 21/577 726/25 |
| 2014/0237545 A1 * | 8/2014 | Mylavarapu | H04L 63/1441 726/25 |
| 2015/0096011 A1 | 4/2015 | Watt | |
| 2015/0106437 A1 | 4/2015 | Hudson et al. | |
| 2017/0310692 A1 * | 10/2017 | Ackerman | H04L 63/1458 |
| 2018/0069668 A1 | 3/2018 | Jorgensen | |
| 2018/0212834 A1 | 7/2018 | Levchuk et al. | |
| 2019/0297113 A1 * | 9/2019 | Yang | H04L 63/1408 |
| 2020/0137102 A1 * | 4/2020 | Sheridan | H04L 63/105 |
| 2020/0153846 A1 * | 5/2020 | Srivastava | H04W 4/80 |
| 2020/0162503 A1 * | 5/2020 | Shurtleff | H04L 41/0883 |
| 2020/0177485 A1 * | 6/2020 | Shurtleff | H04L 41/142 |
| 2020/0322369 A1 * | 10/2020 | Raghuramu | H04L 63/1433 |
| 2022/0360597 A1 * | 11/2022 | Fellows | G06F 21/577 |

* cited by examiner

SYSTEM FOR GENERATING COMPUTING NETWORK SEGMENTATION AND ISOLATION SCHEMES USING DYNAMIC AND SHIFTING CLASSIFICATION OF ASSETS

FIELD OF THE INVENTION

The present disclosure embraces a system for generating computing network segmentation and isolation schemes using dynamic and shifting classification of assets.

BACKGROUND

There is a need for a way to identify, prevent, and rectify security threats for computing devices within a network environment.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for generating computing network segmentation and isolation schemes using dynamic and shifting classification of assets. In particular, the system may comprise various components that may identify and classify assets (e.g., computing devices) within a network, network topology, and vectors that may compromise one or more assets. The system may further comprise a component for mitigating and rectifying the effects of such vectors. Each asset within the network may be assigned a classification which may be dynamically modified and/or shifted by the system based on changing requirements and/or environments. In this way, the system may provide a more comprehensive way to protect the integrity and security of computing devices and/or electronic data.

Accordingly, embodiments of the present disclosure provide a system for generating computing network segmentation and isolation schemes using dynamic and shifting classification of assets. The system may comprise a memory device with computer-readable program code stored thereon; a communication device; and a processing device operatively coupled to the memory device and the communication device. The processing device may be configured to execute the computer-readable program code to identify one or more computing assets within a network; determine one or more classifications for each of the one or more computing assets; generate an asset library comprising a list of the one or more computing assets and the one or more classifications; identify a network topology based on the one or more computing assets within the asset library; identify a first set of compromise vectors associated with the one or more classifications of the one or more computing assets; and generate a first set of recommended actions, the first set of recommended actions comprising one or more remediation steps associated with the first set of compromise vectors.

In some embodiments, the computer-readable program code further causes the processing device to detect a shift in a condition associated with the one or more computing assets; dynamically update the one or more classifications based on the shift in the condition associated with the one or more computing assets; identify a second set of compromise vectors associated with the one or more classifications of the one or more computing assets; and generate a second set of recommended actions, the second set of recommended actions comprising one or more remediation steps associated with the second set of compromise vectors.

In some embodiments, the shift in the condition associated with the one or more computing assets comprises a change in geographic location of the one or more computing assets, wherein the second set of compromise vectors are associated with the change in geographic location of the one or more computing assets.

In some embodiments, determining the one or more classifications for each of the one or more computing assets is based on one or more characteristics of the one or more computing assets, the one or more characteristics comprising at least one of operating system, geographic location, and hardware configuration.

In some embodiments, the one or more remediation steps associated with the first set of compromise vectors comprises isolating, from the network, the one or more computing assets.

In some embodiments, the one or more remediation steps associated with the first set of compromise vectors comprises updating antivirus definitions of the one or more computing assets.

In some embodiments, the first set of compromise vectors comprises a computer virus.

Embodiments of the present disclosure also provide a computer program product for generating computing network segmentation and isolation schemes using dynamic and shifting classification of assets. The computer program product may comprise at least one non-transitory computer readable medium having computer-readable program code portions embodied therein, the computer-readable program code portions comprising executable code portions for identifying one or more computing assets within a network; determining one or more classifications for each of the one or more computing assets; generating an asset library comprising a list of the one or more computing assets and the one or more classifications; identifying a network topology based on the one or more computing assets within the asset library; identifying a first set of compromise vectors associated with the one or more classifications of the one or more computing assets; and generating a first set of recommended actions, the first set of recommended actions comprising one or more remediation steps associated with the first set of compromise vectors.

In some embodiments, the computer-readable code portions further comprise executable code portions for detecting a shift in a condition associated with the one or more computing assets; dynamically updating the one or more classifications based on the shift in the condition associated with the one or more computing assets; identifying a second set of compromise vectors associated with the one or more classifications of the one or more computing assets; and generating a second set of recommended actions, the second set of recommended actions comprising one or more remediation steps associated with the second set of compromise vectors.

In some embodiments, the shift in the condition associated with the one or more computing assets comprises a change in geographic location of the one or more computing assets, wherein the second set of compromise vectors are associated with the change in geographic location of the one or more computing assets.

In some embodiments, determining the one or more classifications for each of the one or more computing assets is based on one or more characteristics of the one or more computing assets, the one or more characteristics comprising at least one of operating system, geographic location, and hardware configuration.

In some embodiments, the one or more remediation steps associated with the first set of compromise vectors comprises isolating, from the network, the one or more computing assets.

In some embodiments, the one or more remediation steps associated with the first set of compromise vectors comprises updating antivirus definitions of the one or more computing assets.

Embodiments of the present disclosure also provide computer-implemented method for generating computing network segmentation and isolation schemes using dynamic and shifting classification of assets, wherein the computer-implemented method comprises identifying one or more computing assets within a network; determining one or more classifications for each of the one or more computing assets; generating an asset library comprising a list of the one or more computing assets and the one or more classifications; identifying a network topology based on the one or more computing assets within the asset library; identifying a first set of compromise vectors associated with the one or more classifications of the one or more computing assets; and generating a first set of recommended actions, the first set of recommended actions comprising one or more remediation steps associated with the first set of compromise vectors.

In some embodiments, the computer-implemented method further comprises detecting a shift in a condition associated with the one or more computing assets; dynamically updating the one or more classifications based on the shift in the condition associated with the one or more computing assets; identifying a second set of compromise vectors associated with the one or more classifications of the one or more computing assets; and generating a second set of recommended actions, the second set of recommended actions comprising one or more remediation steps associated with the second set of compromise vectors.

In some embodiments, the shift in the condition associated with the one or more computing assets comprises a change in geographic location of the one or more computing assets, wherein the second set of compromise vectors are associated with the change in geographic location of the one or more computing assets.

In some embodiments, determining the one or more classifications for each of the one or more computing assets is based on one or more characteristics of the one or more computing assets, the one or more characteristics comprising at least one of operating system, geographic location, and hardware configuration.

In some embodiments, the one or more remediation steps associated with the first set of compromise vectors comprises isolating, from the network, the one or more computing assets.

In some embodiments, the one or more remediation steps associated with the first set of compromise vectors comprises updating antivirus definitions of the one or more computing assets.

In some embodiments, the first set of compromise vectors comprises a computer virus.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
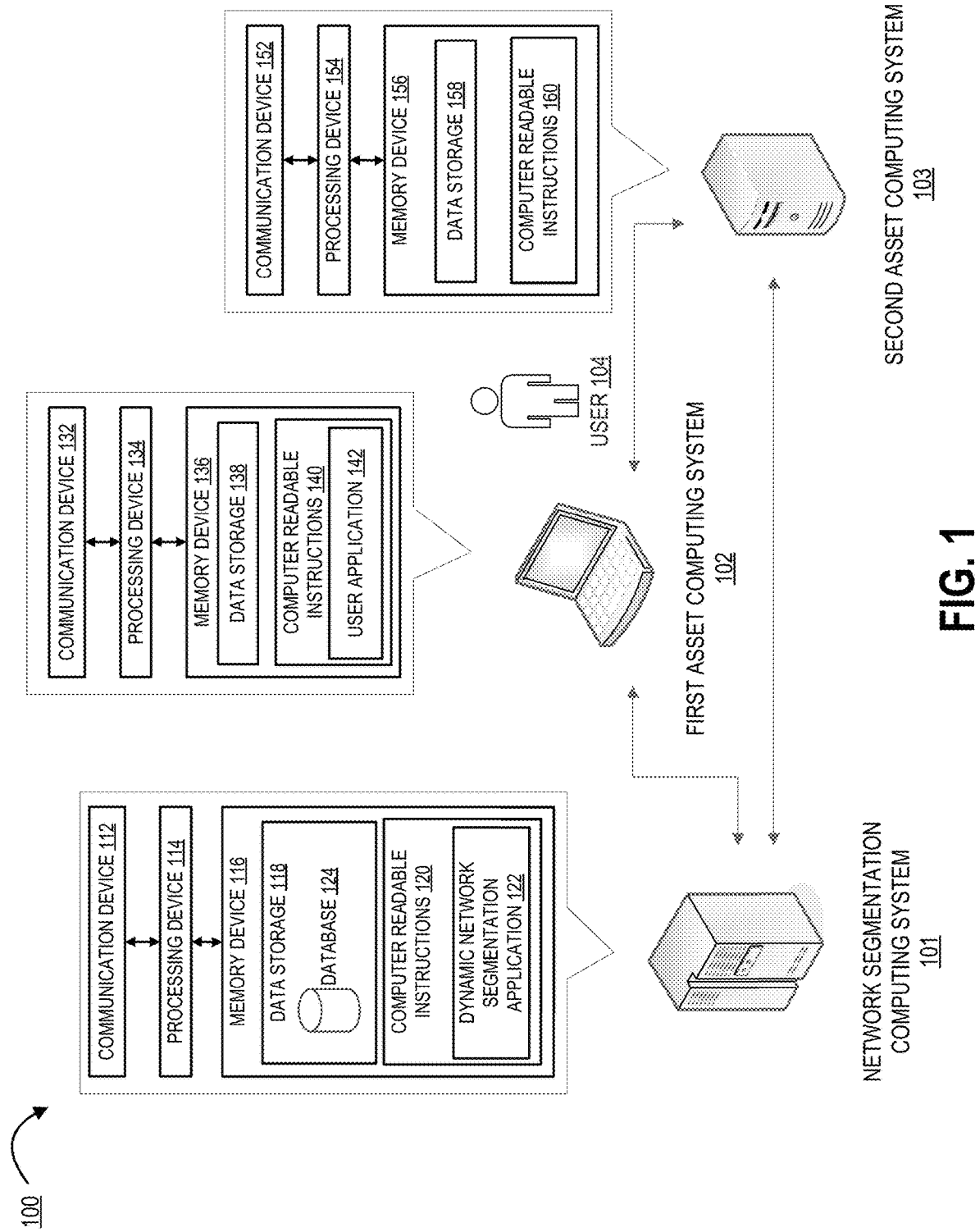
Figure 2:
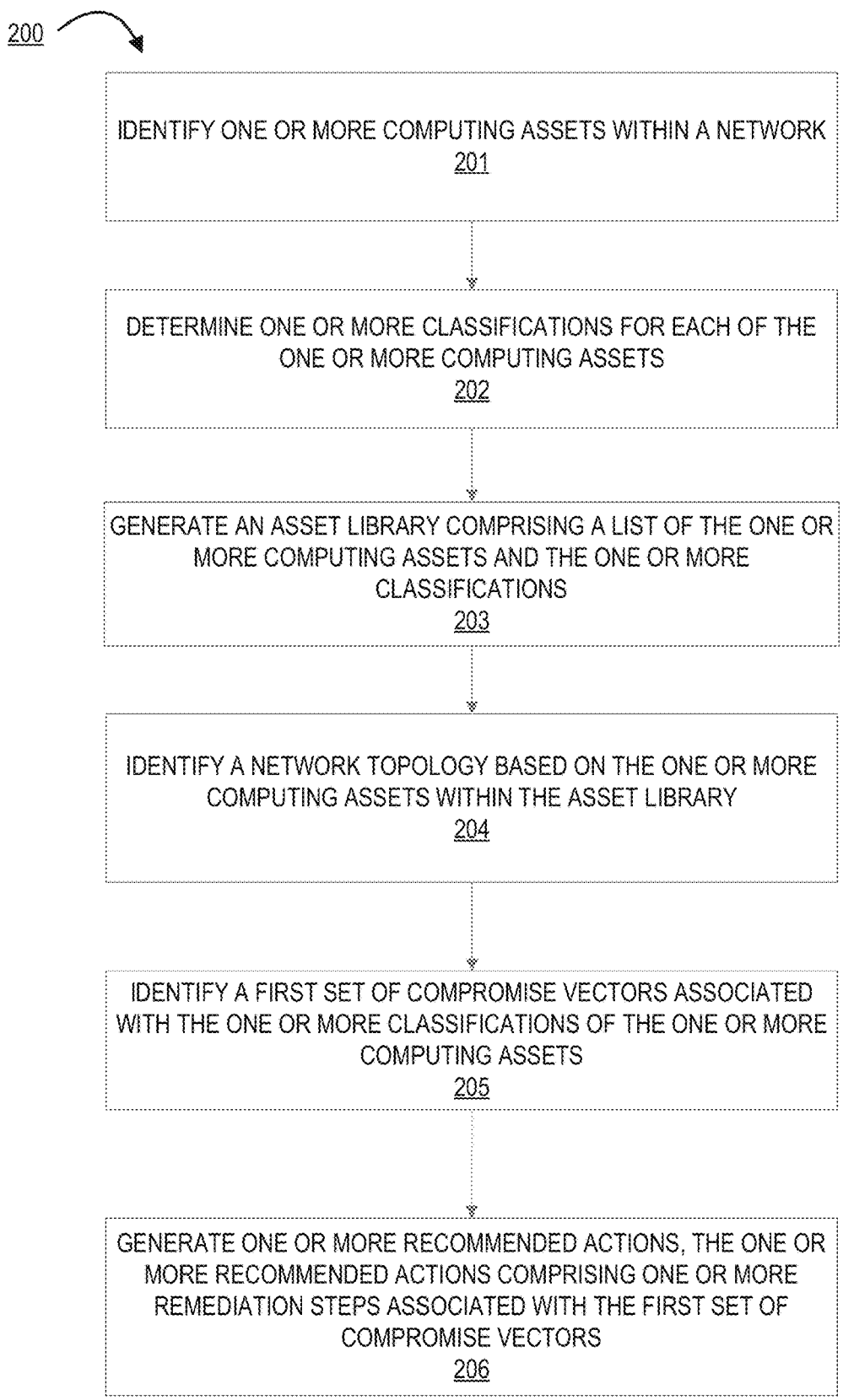

Having thus described embodiments of the invention in general terms, reference will now be made to the accompanying drawings, wherein:

FIG. 1 illustrates an operating environment for the dynamic network segmentation system, in accordance with one embodiment of the present disclosure; and FIG. 2 illustrates a process flow for driving network segmentation and isolation based on dynamic and shifting asset classifications, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Asset" as used herein may refer to physical and virtual objects and/or processes used to accomplish the entity's objectives. In this regard, "resource" may refer to software (e.g., applications, libraries, or the like), data files, computing systems and/or hardware (e.g., laptop computers, smartphones, or the like), computing resources (e.g., processing power, memory space, or the like), computing functions, or the like.

"Network segmentation" or "segmentation" as used herein may refer to a process for using physical or logical boundaries to separate assets and/or clusters of assets from one another within a network to create subsections of the network. Examples of segmentation methods or implements may include routers, switches, physical cable disconnects, wireless jammers, firewall rules, virtual local area networks (VLAN), and the like. Segmentation may be carried out at macro levels (e.g., data centers, geographic regions, or the like) and/or at the micro level (specific computing systems, hardware devices, and/or data).

Network segmentation provides numerous security and/or performance benefits to the computing systems within a network environment. For instance, by controlling the flow of network traffic in and out of the various subnetworks, the system may limit the surfaces open to attack from certain vectors that may compromise the systems within the network (e.g., "compromise vectors" such as computer viruses or other types of malicious code, unauthorized access to systems and/or data, or the like) and help ensure that effects that may result from the vectors are localized to the affected systems within the subnetwork. That said, the conditions in which the network exist, as well as compromise vectors, may rapidly shift over time.

Accordingly, the system as described herein provides a way to dynamically generate network segmentation schemes using shifting asset classification schemes in order to account for shifting conditions and compromise vectors. In this regard, the system may comprise a data repository comprising an asset inventory, where the asset inventory comprises one or more hierarchical tables (e.g., a relational table in which certain entries may be ordered based on relationships and/or dependencies) of each asset within the network environment. In some embodiments, the system may be configured to crawl the network to identify the various assets that may be connected to the network. The system may then use artificial intelligence and/or machine learning to dynamically assign one or more classifications to each asset. For instance, the system may assign classifications based on attributes such as geographic location, organizational use or purpose, service groupings, software groupings, or the like. The classifications may be assigned by the system dynamically (e.g., classifications may change in response to shifting conditions or vectors) and interconnectedly (e.g., assets may be assigned to various classification systems and/or different hierarchies/levels based on shifting conditions).

The data repository may further comprise one or more network topologies which may indicate the manner in which the various assets are arranged within the network. In this regard, network topologies may be selected and/or configured based on the various types of network traffic (e.g., data packets sent to and received by the assets within the network). In some embodiments, the system may be configured to crawl the network to identify the topology/configuration of the various assets, where each relationship may further be classified and/or assigned hierarchies according to shifting requirements. Accordingly, in some embodiments, the network topology may be expressed using a graph database, in which the assets are expressed as nodes of the graph database and the connections/network traffic are expressed as edges between the nodes.

The system may further comprise a compromise vector component which may comprise information regarding various compromise vectors that may affect the assets and/or the network traffic. In this regard, the compromise vector component may receive information about such vectors from sources such as external intelligence feeds or from internal knowledge regarding vectors that may affect the assets and/or the network. Each compromise vector may further be classified according to the effects of such vector on certain classifications of the assets and/or the network, where the vector may have different effects on different classifications and/or different levels within the hierarchies. For instance, a computer virus may create a greater adverse effect on one type of operating system than another or be particularly damaging to a particular data center. In this regard, the system may assign associations and/or groupings of vectors according to the assets or topologies that the vectors may affect.

Based on the data collected as described above, the system may, via a recommendation and action engine, generate recommended remediation steps to mitigate the potential for certain vectors to affect assets and/or the network as a whole. For instance, based on detecting that a vector has an increased chance of affecting certain assets and/or subnetworks, the system may recommend that network traffic for such assets and/or subnetworks are restricted. For instance, the system may recommend that the assets and/or subnetworks are restricted from receiving and/or sending File Transfer Protocol ("FTP") network packets. In other cases, the system may recommend that the assets and/or subnetworks are temporarily isolated from the network entirely. In yet other cases, the system may recommend other inoculation methods such as software updates, new antivirus signature files, application blocklists and/or allowlists, and the like. In this regard, in some embodiments, the system may hook into firewalls, routers, switches, or other types of physical or logical network enforcement mechanisms as well as the assets or subnetworks themselves to automatically implement the recommended remediation steps. The system may further provide predictive alerts or reports based on historical data regarding vectors and/or shifting asset classifications. For example, if historical data suggests that a certain type of attack (e.g., a DoS attack) is more common in certain timeframes (e.g., times of the day, certain months, or the like), the system may predict that such an attack is likely to occur when certain conditions (e.g., the timeframes) are met. Accordingly, the system may generate recommendations to address the predicted conditions (e.g., enforcing new firewall rules to block incoming network traffic on certain ports).

An exemplary use case is provided for illustrative purposes. In one exemplary embodiment, the system may detect that an asset listed in the asset inventory (e.g., a portable computing system such as a laptop computer) has moved from one geographic location to another. In such an embodiment, the system may dynamically shift classifications for such asset relating to its geographic location. In turn, the type of vectors that may affect the asset may also change to the extent that certain vectors affect particular geographic locations more than others. Based on the above, the system may provide one or more recommended remediation steps based on the shifting classifications (e.g., new firewall rules, encryption requirements, virtual network requirements, or the like). In some embodiments, the system may automatically implement the remediation steps by hooking into the asset directly.

The system as described herein confers a number of technological advantages over conventional network management systems. In particular, by dynamically shifting classifications of assets, subnetworks, and/or vectors, the system may protect assets against adverse effects or misuse even in the midst of rapidly changing technological conditions and/or environments. Furthermore, using the remediation and prediction functions of the recommendation and action engine allows the system further reduces the response time for deploying remediating processes, which in turn further increases the security of the assets within the network.

Turning now to the figures, FIG. 1 illustrates an operating environment 100 for the dynamic network segmentation system, in accordance with one embodiment of the present disclosure. In particular, FIG. 1 illustrates a network segmentation computing system 101 that is operatively coupled, via a network, to a first asset computing system 102 and/or a second asset computing system 103. In such a configuration, the network segmentation computing system 101 may transmit information to and/or receive information from the first asset computing system 102 and/or the second asset computing system 103. It should be understood that FIG. 1 illustrates only an exemplary embodiment of the operating environment 100, and it will be appreciated that the operating environment 100 may comprise a fewer or greater number of computing systems and/or devices than are depicted in FIG. 1. For example, though the FIG. 1 depicts a first asset computing system 102 and a second asset computing system 103, some embodiments may include a third asset computing system, fourth asset computing system, and so on. It should also be understood that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the network segmentation computing system 101 is depicted as a single unit, the functions of the network segmentation computing system 101 may be distributed across multiple computing systems.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the network segmentation computing system 101 may be a networked server, desktop computer, laptop computer, routing device, or other type of computing system within the network environment which performs the processes for dynamically classifying assets, subnetworks, and vectors and for generating recommendations, generating predictions based on historical data, and implementing remediation processes, as described herein. Accordingly, the network segmentation computing system 101 may comprise a processing device 114 operatively coupled to a communication device 112 and a memory device 116 having data storage 118 and computer readable instructions 120 stored thereon.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 uses the communication device 112 to communicate with the network and other devices on the network, such as, but not limited to the first asset computing system 102 and/or the second asset computing system 103. The communication device 112 generally comprises a modem, antennae, WiFi or Ethernet adapter, radio transceiver, or other device for communicating with other devices on the network.

The computer-readable instructions 120 may comprise a process execution control application 122, which may comprise computer-executable program code which may instruct the processing device 114 to perform certain logic, data processing, and data storing functions of the application to accomplish the entity's objectives. For instance, the process execution control application 122 may crawl the network to detect the presence of the first asset computing system 102 and/or the second asset computing system 103 on the network to perform the classification functions as described herein. Furthermore, the network segmentation computing system 101 may be configured to hook into the first asset computing system 102 and/or the second asset computing system 103 to implement one or more remediation steps based on the dynamic classification schemes generated by the network segmentation computing system 101.

In some embodiments, the memory device 116 includes data storage 118 for storing data related to the system environment. In this regard, the data storage 118 may comprise a database 124, which may comprise information regarding the classification of assets, subnetworks, and/or compromise vectors. Accordingly, in one embodiment, the database 124 may comprise a relational (e.g., SQL) database which may comprise hierarchical tables of the various assets, subnetworks, and/or compromise vectors. In some embodiments, the database 124 may, instead of or in addition to a relational database, comprise a graph database which reflects the network topology associated with the assets and/or the compromise vectors. It should be understood that in alternative embodiments, the database 124 may be hosted on a separate computing system (e.g., a database server) instead of being hosted on the network segmentation computing system 101.

As further illustrated in FIG. 1, the operating environment 100 may further comprise a first asset computing system 102 in operative communication with the network segmentation computing system 101. In some embodiments, the first asset computing system 102 may be a computing system that is operated by a user 104, such as an administrator, agent, or employee of the entity. Accordingly, the first asset computing system 102 may be a device such as a desktop computer, laptop, IoT device, smartphone, tablet, single-board computer, or the like which may be classified according to its characteristics (e.g., operating system, geographic location, installed applications, hardware and/or software configuration, organizational/business units, authorized users, or the like) by the network segmentation computing system 101. The first asset computing system 102 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The first asset computing system 102 may comprise a processing device 134 operatively coupled to a communication device 132 and a memory device 136 having data storage 138 and computer readable instructions 140 stored thereon, where the computer readable instructions 140 may include a user application 142. The user application 142 may be, for instance, a process or program that may be executed by the user 104.

In some embodiments, the operating environment 100 may further comprise a second asset computing system 103. The second asset computing system 103 may be another computing system within the network such as a server or networked terminal. In this regard, the second asset computing system 103 may comprise a processing device 154 operatively coupled to a communication device 152 and a memory device 156 comprising data storage 158 and computer readable instructions 160. Similar to the first asset computing system 102, the second asset computing system 103 may be classified by the network segmentation computing system 101 according to its characteristics. In some embodiments, the second asset computing system 103 may send and receive network traffic to and from the first asset computing system 102. In such embodiments, the network segmentation computing system 101 may define the first asset computing system 102 and the second asset computing system 103 as being a part of the same subnetwork and account for such a subnetwork when identifying the network topology. Accordingly, the network segmentation computing system 101 may further be configured to detect the types of network traffic that pass back and forth between the first asset computing system 102 and the second asset computing system 103.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for driving network segmentation and isolation based on dynamic and shifting asset classifications, in accordance with some embodiments. The process begins at block 201, where the system identifies one or more computing assets within a network of an entity (e.g., a business organization). In some embodiments, the system may be configured to crawl the network to detect the various assets that may be connected to the entity's network. In other embodiments, the system may be configured to manually receive information about certain assets (e.g., from the entity). In this regard, the computing assets may be computing systems within the network environment. For instance, a laptop operated by an employee of the entity may be an example of a computing asset that may be detected by the system.

The process continues to block 202, where the system determines one or more classifications for each of the one or more computing assets. The system may dynamically assign various classifications to assets based on the characteristics of the asset and/or the environment in which the asset functions, such as operating system, hardware and/or software configuration, installed applications, historical and/or current geographic location, IP address, and the like. In this regard, certain classifications associated with a particular asset may shift over time. Continuing the above example, a portable device such as a laptop may be physically located in a first geographic location at a first point in time but later be located in a second geographic location at a second point in time. Accordingly, the system may continuously monitor assets and dynamically reassign classifications based on a change in status of the monitored assets.

The process continues to block 203, where the system generates an asset library comprising a list of the one or more computing assets and the one or more classifications. In some embodiments, information about the assets along with their associated classifications may be stored within a hierarchical table (e.g., in a relational format). The assets and/or the classifications within the asset library may be updated automatically by the system based on shifting requirements and/or environments in which the assets are functioning.

The process continues to block 204, where the system identifies a network topology based on the one or more computing assets within the asset library. In some embodiments, the system may crawl the network to identify the locations of assets as well as the configuration of assets within the network. In this regard, the system may be configured to monitor network traffic between the one or more assets (e.g., network protocol, packet type, packet contents, and the like). Accordingly, the system may further apply classifications to configurations of assets (e.g., subnetworks) based on the characteristics of the subnetworks (e.g., number and/or type of devices within the network, the types of network traffic passing between devices, geographic location of the devices in the subnetwork, and the like).

The process continues to block 205, where the system identifies a first set of compromise vectors associated with the one or more classifications of the one or more computing assets. In some embodiments, information about compromise vectors may be entered into the system manually. In other embodiments, the system may automatically retrieve information about compromise vectors from a source such as an intelligence feed. Compromise vectors may include actions, circumstances, or processes which may compromise the integrity, security, or otherwise interfere with the proper functioning of certain assets and/or subnetworks. In this regard, compromise vectors may include computer viruses, software bugs, unauthorized attempts to gain access to or hinder the performance of computing devices, or the like. Certain compromise vectors may affect assets belonging to certain classifications compared to others. For instance, certain computer viruses may affect assets running a particular kernel version of a particular operating system. As another example, a DoS attack may be found to be more commonly executed against computing systems within a particular geographic area.

The process concludes at block 206, where the system generates one or more recommended actions, the one or more recommended actions comprising one or more remediation steps associated with the first set compromise vectors. The one or more remediation steps may include preventative processes or actions that may be taken to inoculate an at risk computing asset against certain compromise vectors and/or corrective processes or actions intended to rectify disruptions or harmful modifications to the computing asset that occurred as a result of such compromise vectors. In this regard, preventative processes may include granular segmentation of the subnetwork to which the asset belongs (e.g., a rule requiring that the subnetwork encrypt network traffic or use a virtual private network), implementation and enforcement of network traffic rules, changes to application policies, software and/or antivirus definition updates, firewall rule updates, and the like. Examples of corrective processes may include malware removal, software resets, data restoration, and the like.

In some embodiments, the system may be configured to automatically implement the one or more remediation steps based on detecting changes to asset, subnetwork, and/or vector classifications. In this regard, the system may hook into the process loops of the assets within the network to automatically execute preventative and/or corrective processes with respect to such assets. In this way, the system provides a way to dynamically address compromise vectors even in rapidly shifting circumstances.

Continuing the above example, the system may determine that a geographic location of the laptop has changed (e.g., the user has taken the laptop on an overseas trip). Based on the change in geographic location, the system may dynamically update the classifications of the laptop to reflect the changed location. In turn, the system may identify certain vectors that may be associated with the geographic location. For instance, a particular compromise vector may be especially relevant to assets within the geographic location (e.g., networking devices at the geographic location use an outdated encryption standard). Upon detecting the issue, the system may implement certain remediation steps (e.g., force network traffic through a VPN) with respect to the affected asset (e.g., the laptop).

In some embodiments, the system may further be configured to, via a machine learning/AI based mechanism, provide predictive recommendations based on historical data associated with assets, subnetworks, and/or vectors. For instance, the system may read historical data of changes in a particular asset's classification, which in turn allows the system to identify the vectors that may affect the asset in various classification schemes. Based on the foregoing, the system may then predict a future classification scheme for a particular asset and provide recommendations based on the future classification scheme. Continuing the above example, the system may detect that the laptop switches between two designated geographic locations at regular intervals (e.g., the laptop is located in Location A for 11 months, then in Location B for 1 month). Based on such historical data, the system may provide a predictive recommendation to implement remediation steps in anticipation of the laptop switching geographic locations, as described above. In this way, the system may use predictive analytics to increase the security of assets within the computing network.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating computing network segmentation and isolation schemes using dynamic and shifting classification of assets, the system comprising:
  a memory device with computer-readable program code stored thereon;
  a communication device; and
  a processing device operatively coupled to the memory device and the communication device, wherein the processing device is configured to execute the computer-readable program code to:
    continuously crawl a network to detect and identify one or more computing assets connected to the network;
    based on crawling the network, dynamically assign one or more classifications for each of the one or more computing assets based on a change in status of the one or more computing assets;
    generate an asset library comprising a list of the one or more computing assets and the one or more classifications;
    identify a network topology based on the one or more computing assets within the asset library;
    monitor network traffic between the one or more computing assets;
    based on monitoring the network traffic, assign classifications to one or more subnetworks associated with the one or more computing assets based on characteristics of the one or more subnetworks;
    identify a first set of compromise vectors associated with the one or more classifications of the one or more computing assets and the one or more subnetworks;
    generate a first set of recommended actions, the first set of recommended actions comprising one or more remediation steps associated with the first set of compromise vectors, wherein the one or more remediation steps comprises at least one preventative process, wherein the preventative process comprises automatically executing network segmentation of the one or more subnetworks;
    read historical data associated with the one or more computing assets and the one or more subnetworks to detect historical changes in the classifications to the one or more subnetworks and the one or more assets;
    based on the historical changes, generate a prediction for a future classification scheme for the one or more subnetworks and the one or more assets; and based on the future classification scheme, generate a set of future recommended actions, the future recommended actions comprising:
  hooking into a process loop of the one or more assets within the one or more subnetworks; and
  automatically implementing a network traffic rule, wherein the network traffic rule forces network traffic associated with the one or more assets to be routed through a virtual private network.

2. The system according to claim 1, wherein the computer-readable program code further causes the processing device to:
  detect a shift in a condition associated with the one or more computing assets;
  dynamically update the one or more classifications based on the shift in the condition associated with the one or more computing assets;
  identify a second set of compromise vectors associated with the one or more classifications of the one or more computing assets; and
  generate a second set of recommended actions, the second set of recommended actions comprising one or more remediation steps associated with the second set of compromise vectors.

3. The system according to claim 2, wherein the shift in the condition associated with the one or more computing assets comprises a change in geographic location of the one or more computing assets, wherein the second set of compromise vectors are associated with the change in geographic location of the one or more computing assets.

4. The system according to claim 1, wherein determining the one or more classifications for each of the one or more computing assets is based on one or more characteristics of the one or more computing assets, the one or more characteristics comprising at least one of operating system, geographic location, and hardware configuration.

5. The system according to claim 1, wherein the one or more remediation steps associated with the first set of compromise vectors comprises isolating, from the network, the one or more computing assets.

6. The system according to claim 1, wherein the one or more remediation steps associated with the first set of compromise vectors comprises updating antivirus definitions of the one or more computing assets.

7. The system according to claim 1, wherein the first set of compromise vectors comprises a computer virus.

8. A computer program product for generating computing network segmentation and isolation schemes using dynamic and shifting classification of assets, the computer program product comprising at least one non-transitory computer readable medium having computer-readable program code portions embodied therein, the computer-readable program code portions comprising executable code portions for:
  continuously crawling a network to detect and identify one or more computing assets connected to the network;
  based on crawling the network, dynamically assigning one or more classifications for each of the one or more computing assets based on a change in status of the one or more computing assets;
  generating an asset library comprising a list of the one or more computing assets and the one or more classifications;
  identifying a network topology based on the one or more computing assets within the asset library;
  monitoring network traffic between the one or more computing assets;
  based on monitoring the network traffic, assigning classifications to one or more subnetworks associated with the one or more computing assets based on characteristics of the one or more subnetworks;
  identifying a first set of compromise vectors associated with the one or more classifications of the one or more computing assets and the one or more subnetworks;
  generating a first set of recommended actions, the first set of recommended actions comprising one or more remediation steps associated with the first set of compromise vectors, wherein the one or more remediation steps comprises at least one preventative process, wherein the preventative process comprises automatically executing network segmentation of the one or more subnetworks;
  reading historical data associated with the one or more computing assets and the one or more subnetworks to detect historical changes in the classifications to the one or more subnetworks and the one or more assets;
  based on the historical changes, generating a prediction for a future classification scheme for the one or more subnetworks and the one or more assets; and
  based on the future classification scheme, generating a set of future recommended actions, the future recommended actions comprising:
    hooking into a process loop of the one or more assets within the one or more subnetworks; and
    automatically implementing a network traffic rule, wherein the network traffic rule forces network traffic associated with the one or more assets to be routed through a virtual private network.

9. The computer program product according to claim 8, wherein the computer-readable code portions further comprise executable code portions for:
  detecting a shift in a condition associated with the one or more computing assets;
  dynamically updating the one or more classifications based on the shift in the condition associated with the one or more computing assets;
  identifying a second set of compromise vectors associated with the one or more classifications of the one or more computing assets; and
  generating a second set of recommended actions, the second set of recommended actions comprising one or more remediation steps associated with the second set of compromise vectors.

10. The computer program product according to claim 9, wherein the shift in the condition associated with the one or more computing assets comprises a change in geographic location of the one or more computing assets, wherein the second set of compromise vectors are associated with the change in geographic location of the one or more computing assets.

11. The computer program product according to claim 8, wherein determining the one or more classifications for each of the one or more computing assets is based on one or more characteristics of the one or more computing assets, the one or more characteristics comprising at least one of operating system, geographic location, and hardware configuration.

12. The computer program product according to claim 8, wherein the one or more remediation steps associated with the first set of compromise vectors comprises isolating, from the network, the one or more computing assets.

13. The computer program product according to claim 8, wherein the one or more remediation steps associated with the first set of compromise vectors comprises updating antivirus definitions of the one or more computing assets.

14. A computer-implemented method for generating computing network segmentation and isolation schemes using dynamic and shifting classification of assets, wherein the computer-implemented method comprises:

continuously crawling a network to detect and identify one or more computing assets connected to the network;

based on crawling the network, dynamically assigning one or more classifications for each of the one or more computing assets based on a change in status of the one or more computing assets;

generating an asset library comprising a list of the one or more computing assets and the one or more classifications;

identifying a network topology based on the one or more computing assets within the asset library;

monitoring network traffic between the one or more computing assets;

based on monitoring the network traffic, assigning classifications to one or more subnetworks associated with the one or more computing assets based on characteristics of the one or more subnetworks;

identifying a first set of compromise vectors associated with the one or more classifications of the one or more computing assets and the one or more subnetworks;

generating a first set of recommended actions, the first set of recommended actions comprising one or more remediation steps associated with the first set of compromise vectors, wherein the one or more remediation steps comprises at least one preventative process, wherein the preventative process comprises automatically executing network segmentation of the one or more subnetworks;

reading historical data associated with the one or more computing assets and the one or more subnetworks to detect historical changes in the classifications to the one or more subnetworks and the one or more assets;

based on the historical changes, generating a prediction for a future classification scheme for the one or more subnetworks and the one or more assets; and based on the future classification scheme, generating a set of future recommended actions, the future recommended actions comprising:

hooking into a process loop of the one or more assets within the one or more subnetworks; and automatically implementing a network traffic rule, wherein the network traffic rule forces network traffic associated with the one or more assets to be routed through a virtual private network.

15. The computer-implemented method according to claim 14, wherein the computer-implemented method further comprises:

detecting a shift in a condition associated with the one or more computing assets;

dynamically updating the one or more classifications based on the shift in the condition associated with the one or more computing assets;

identifying a second set of compromise vectors associated with the one or more classifications of the one or more computing assets; and generating a second set of recommended actions, the second set of recommended actions comprising one or more remediation steps associated with the second set of compromise vectors.

16. The computer-implemented method according to claim 15, wherein the shift in the condition associated with the one or more computing assets comprises a change in geographic location of the one or more computing assets, wherein the second set of compromise vectors are associated with the change in geographic location of the one or more computing assets.

17. The computer-implemented method according to claim 14, wherein determining the one or more classifications for each of the one or more computing assets is based on one or more characteristics of the one or more computing assets, the one or more characteristics comprising at least one of operating system, geographic location, and hardware configuration.

18. The computer-implemented method according to claim 14, wherein the one or more remediation steps associated with the first set of compromise vectors comprises isolating, from the network, the one or more computing assets.

19. The computer-implemented method according to claim 14, wherein the one or more remediation steps associated with the first set of compromise vectors comprises updating antivirus definitions of the one or more computing assets.

20. The computer-implemented method according to claim 14, wherein the first set of compromise vectors comprises a computer virus.

* * * * *